Nov. 19, 1957     H. H. HOBBS     2,813,508
SELF-POSITIONING CAGE DOOR
Filed May 26, 1955
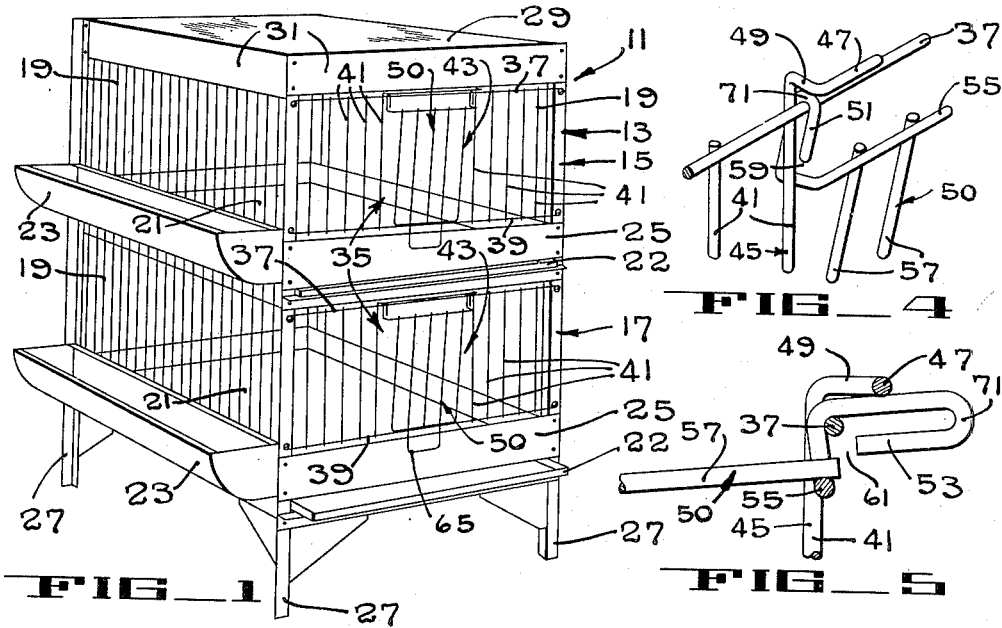
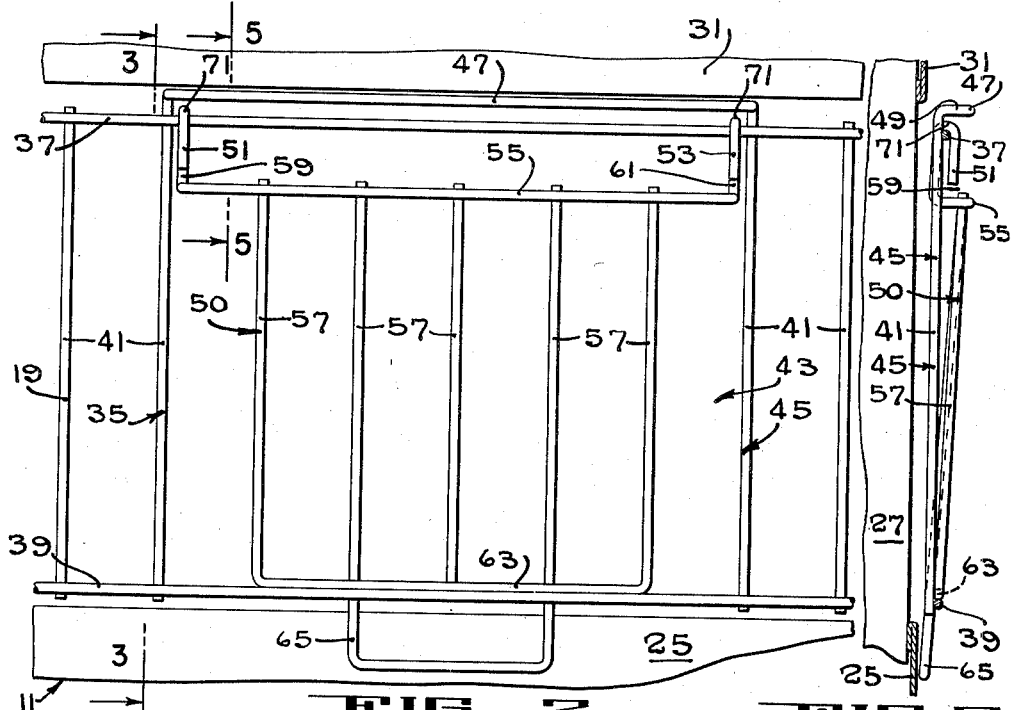
INVENTOR
HOWARD H. HOBBS
BY *Hans G. Hoffmeister*
ATTORNEY United States Patent Office 2,813,508
Patented Nov. 19, 1957

2,813,508

SELF-POSITIONING CAGE DOOR

Howard H. Hobbs, Tipton, Ind., assignor to Food Machinery and Chemical Corporation, San Jose, Calif., a corporation of Delaware Application May 26, 1955, Serial No. 511,304

7 Claims. (Cl. 119—17)

The present invention relates to a gate for poultry cages and the like.

It is an object of the present invention to provide an improved gate for poultry cages.

Another object is to provide a gate for a poultry cage having a door which may be readily locked in open or closed position.

Another object is to provide a gate for a poultry cage having a door which can be easily manipulated with one hand.

These and other objects and advantages of the present invention will become apparent from the following description and the accompanying drawings in which:

Fig. 1 is a perspective of a two-cage poultry housing unit embodying the present invention.

Fig. 2 is a fragmentary enlarged elevation of the unit shown in Fig. 1.

Fig. 3 is a vertical cross section taken along the lines 3—3 of Fig. 2.

Fig. 4 is a fragmentary enlarged perspective of the unit shown in Fig. 1.

Fig. 5 is an enlarged vertical cross section taken along the lines 5—5 of Fig. 2, certain parts being shown in different position.

The gate of the present invention is shown embodied in a poultry housing unit 11 (Fig. 1) of the type frequently used for confining poultry, such as broilers, until they reach a marketable size. The unit 11 comprises a frame 13 which supports two poultry cages 15 and 17 one above the other. The cages 15 and 17 are of conventional construction, having open-work wire sides 19, woven wire floors 21 with drop pans 22 arranged slidably therebeneath, and feeding and watering troughs 23 attached to the outside of the cages where they are readily accessible to poultry within the cages. The frame 13 is reinforced by sheet metal strips 25 extending between the frame uprights 27 near the bottom of each of the cages 15 and 17, and by a top 29 which acts as a roof for the upper cage 15 and has flanged edges 31 depending therefrom for attachment to the frame uprights 27.

Each of the cages 15 and 17 is provided with a gate 35 (Fig. 1) embodying the present invention. The sides 19 of the cages 15 and 17 which contain the gate 35 are formed with upper and lower horizontal support wires 37 and 39 defining two sides of an access opening in said side and are adapted to be secured at their opposite ends to the frame uprights 27 in such a manner that they are spaced laterally and positioned slightly outward of the frame reinforcing strip 25 and flange 31 with the wire 39 slightly above the top edge of said strip, as shown in Fig. 3. A row of parallel vertical wires 41 (Fig. 1) is secured to the support wires 37 and 39 in such a relationship that access to the cages can only be had through a gap or opening 43 (Fig. 2) in the row of wires 41. The wires 41 on the opposite sides of the opening 43 form the legs of an inverted U-shaped wire 45 whose bight portion 47 forming a locking member is slightly higher than the support wire 37 and is outwardly offset therefrom by outwardly extending portions 49 (Figs. 3 and 5) of the U-shaped wire 45.

The upper support wire 37 (Fig. 2) acts as the pivot for a movable wire door 50 adapted to close the opening 43. The door 50 is swingably mounted on the support wire 37 by a pair of elongated upstanding loops 51 and 53 formed at the opposite ends of a horizontal cross wire 55 that is welded to a plurality of parallel vertical wires 57 which form the body of the door 50. The loops 51 and 53 are open, being formed with gaps 59 and 61, respectively, along their outer side to enable them to be easily mounted on the support wire 37. The door 50 has a horizontal cross wire 63 at its bottom edge, and extending downwardly from the wire 63 is a U-shaped tongue 65 being slightly greater in length than the loops 51 and 53 and which is formed integral with two of the vertical wires 57 in the body of the door 50. The tongue 65 is adapted to be inserted between the lower horizontal support wire 39 and the sheet metal reinforcing strip 25, which provide opposed abutment surfaces for the purpose of locking the door 50 in closed position, as shown in Figs. 2 and 3.

In use, when the door 50 is in its closed and locked position, as shown in Figs. 2 and 3, access to the interior of the cages 15 and 17 may be gained by first translationally lifting the door 50 to disengage the locking tongue 65 from between the strip 25 and the lower support wire 39. Due to the elongated shape of the loops 51 and 53, they do not interfere with this lifting, and upon this lifting the bights 71 (Fig. 3) of the loops 51 and 53 are moved out of contact with the pivot wire 37 and they pass upward behind the bight portion 47 of the U-shaped wire 45. The door 50 is then swung slightly inward about the pivot wire 37 and is allowed to drop until the bights 71 of the loops 51 and 53 again rest on the pivot wire 37, as shown in Fig. 4, thus disposing the tongue 65 inwardly of the strip 25. The door 50 is then free to be swung inward and upward about the pivot wire 37 and when it is in a substantially horizontal open position it may be locked therein by translationally pulling the door outward slightly to place the loops 51 and 53 beneath the portion 47 of the wire 45, as shown in Fig. 5, to prevent the door from swinging downward under the urge of gravity. The door will thus be held open and out of the way so that the poultryman will have both hands free for handling the poultry, cleaning the cages, or the like.

When it is desired to again close and lock the door 50, it is translationally pushed inward to remove the loops 51 and 53 from contact with the locking wire portion 47 whereupon the door may be swung downward around the pivot wire 37 and toward the opening 43. When the door is in a substantially vertical position, it is then raised slightly so that the door may be swung outward until the locking tongue 65 contacts the support wire 39, whereupon the door is lowered to move the tongue 65 into locking position between the wire 39 and the strip 25, as shown in Figs. 2 and 3. Inasmuch as the locking tongue 65 of the door cannot be raised above the wire 39, it will be swung against the wire to be positively guided thereby into locked position. The gate can at no time be swung outwardly beyond the wire 39 assuring that the gate can never be left in a position in which it may be pushed open by poultry or the like confined in the cage. It should be noted that the entire operation of unlocking the door, opening it, locking it in open position, unlocking it in its open position, closing it, and locking it again may be accomplished with one hand and, furthermore, that there are no complicated latches, etc. to be manipulated to lock the door in either open or closed position.

While a preferred embodiment of the present invention has been described, it will be understood that various changes and modifications may be made in the details thereof without departing from the spirit and scope of the appended claims.

Having thus described the invention what is claimed as new and desired to be protected by Letters Patent is:

1. A gate for a poultry cage having a side thereof formed by a row of parallel vertical wires connected by a horizontal wire and arranged to provide an access opening in said side comprising a door for closing the opening in said side, rigid elongated loops on the door for swingably and translatably mounting the door on the horizontal wire, and a locking wire integral with one of the vertical wires forming the sides of said opening and spaced higher than the horizontal wire to contact the top of the loops when the door is moved to substantially horizontal open position to hold the door in said open position.

2. A gate for a poultry cage having a side thereof formed by vertically spaced upper and lower horizontal support wires connected by a row of parallel vertical wires arranged to provide an access opening in said side comprising a door for closing the opening in said side, rigid elongated loops on the door for swingably and translatably mounting the door on the upper support wire, and a horizontal locking wire integral with the two vertical wires forming the sides of said opening and spaced higher than and outwardly of the upper support wire to contact the top of the loops when the door is swung inwardly and then translated outwardly to hold the door in a substantially horizontal open position.

3. A gate for a poultry cage having an opening in a side thereof comprising a horizontal pivot wire at the top of the opening, a door for closing the opening, elongated loops on the door for swingably and translatably mounting the same on the pivot wire, a horizontal locking member spaced higher than and outwardly of the pivot wire to contact the top of the loops upon swinging of the door inward into a substantially horizontal open position and then translating the door outward to hold the same in a substantially horizontal open position, a locking tongue at the lower side of the door, and spaced abutment surfaces arranged to receive the locking tongue between them when the door is swung to closed position and translated downwardly to hold the door in a substantially vertical closed position.

4. A gate for a poultry cage having a side thereof formed by a row of parallel vertical wires connected by a horizontal pivot wire and arranged to provide an access opening in said side below said pivot wire comprising a door for closing the opening having a horizontal wire formed at its ends with elongated loops for swingably and translatably mounting the door on the pivot wire, a horizontal locking wire integral with the vertical wires forming the sides of the opening and spaced higher than and outwardly of the pivot wire to contact the top of the loops upon swinging of the door inward into a substantially horizontal open position and then translating the door outward to hold the same in a substantially horizontal open position, a locking tongue at the lower side of the door, and spaced abutment surfaces arranged to receive the locking tongue between them when the door is swung to closed position and translated downwardly to hold the door in a substantially vertical closed position.

5. In a cage for poultry or the like, upper and lower cage side support members defining the top and bottom of an access opening for the cage, a horizontal cage reinforcing strip spaced inwardly of said lower support member, said strip being located adjacent to and below said lower support member in substantially parallel relation thereto, a door having a body portion for closing the access opening between said support members, a tongue on said door extending outwardly therefrom in the plane of said door body portion, the combined height of said body portion and said tongue being greater than the distance between said support members and less than the distance between said upper support member and said reinforcing strip, and means mounting the door interiorly of said cage on said upper support member for swinging and translational movement thereon enabling the door when fully translated away from said lower support member to be swung inwardly of the cage on said upper support member with said tongue moving above said reinforcing strip.

6. In a cage for poultry or the like, upper and lower cage side support members defining the top and bottom of an access opening for the cage, a horizontal cage reinforcing strip spaced inwardly of said lower support member, said strip being located adjacent to and below said lower support member in substantially parallel relation thereto, a door having a body portion for closing the access opening between said support members, a tongue on said door extending outwardly therefrom in the plane of said door body portion, the combined height of said body portion and said tongue being greater than the distance between said support members and less than the distance between said upper support member and said reinforcing strip, means mounting the door interiorly of said cage on said upper support member for swinging and translational movement thereon, and a locking member mounted outwardly from and above said upper support member to engage said door mounting means when said door is swung to substantially horizontal open position and translated outwardly of said cage to hold said door open.

7. A poultry cage having a side provided with an opening therethrough, said side being provided adjacent the top of said opening with a support, a door in said opening, said door having elongated loop means adjacent its top portion in engagement with said support, and a locking member spaced above and laterally of said support, whereby when said door is swung to a horizontal position on said support and moved laterally, said loop means will engage said locking member and hold said door in horizontal position.

References Cited in the file of this patent

UNITED STATES PATENTS

| | | |
|---|---|---|
| 1,024,441 | Davis | Apr. 23, 1912 |
| 1,248,220 | Wayne | Nov. 27, 1917 |